Patented Sept. 25, 1951

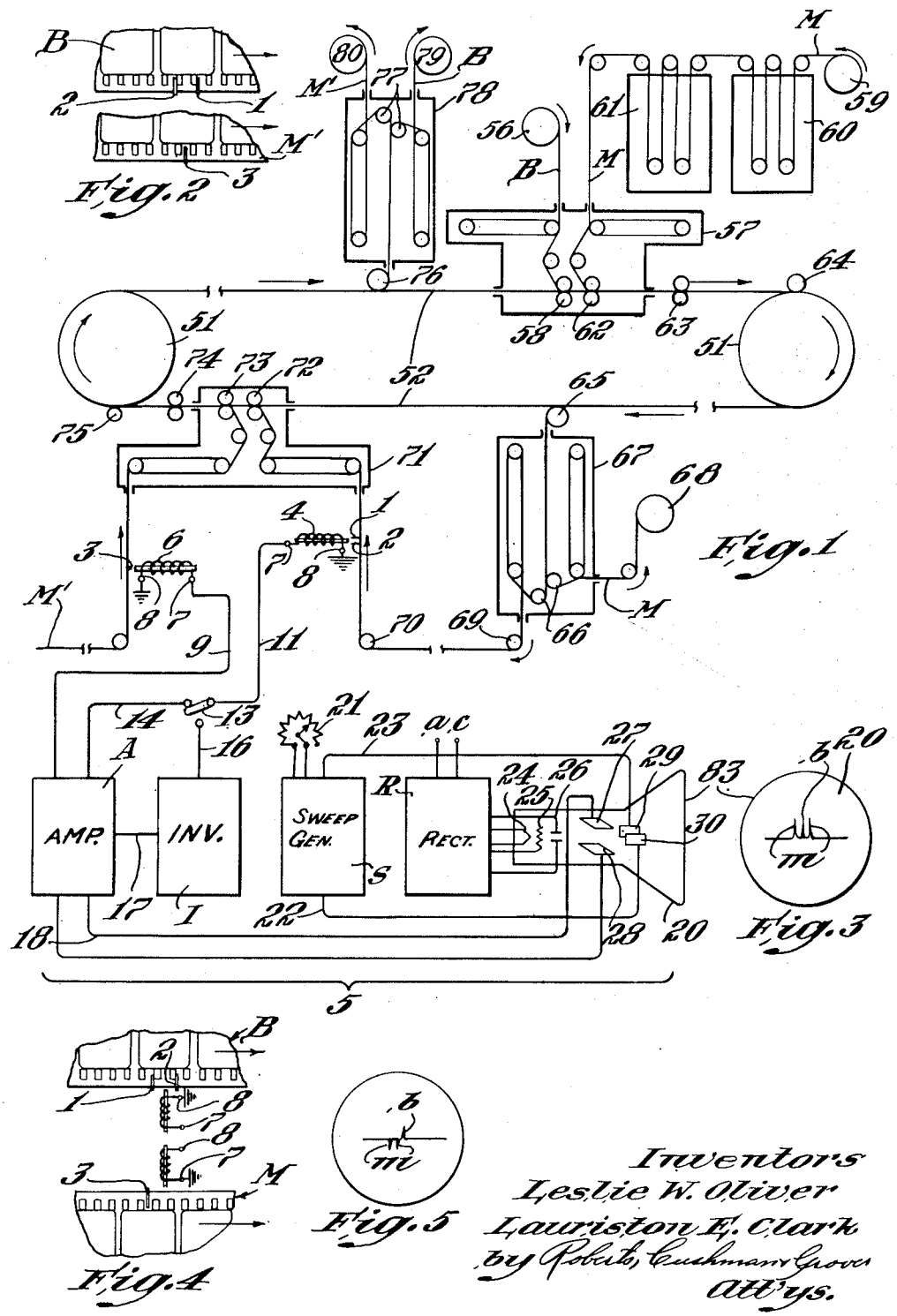

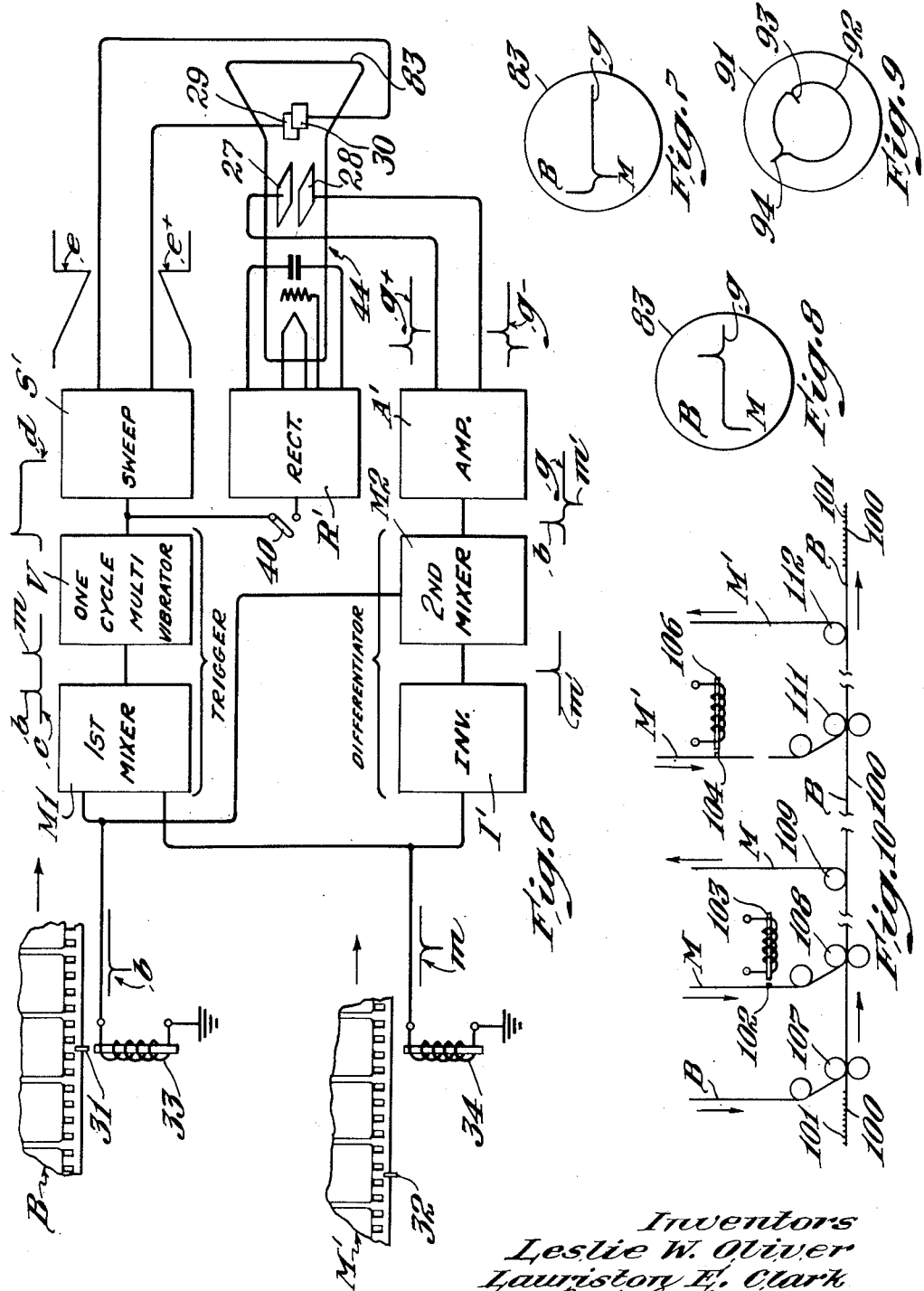

2,569,228

UNITED STATES PATENT OFFICE 2,569,228

DEVIATION DETECTOR APPARATUS FOR FILM REGISTRATION

Lauriston E. Clark, Los Angeles, Calif., and Leslie W. Oliver, Gerrards Cross, England, assignors to Technicolor Motion Picture Corporation, Los Angeles, Calif., a corporation of Maine Application February 16, 1949, Serial No. 76,778

4 Claims. (Cl. 177—311)

The art of cinematography frequently involves disposing in a predetermined relation two or more film strips carrying coincident records, that is, records or copies thereof which have been recorded simultaneously. For example, in producing multi-color films by the imbibition process dye carrying matrices successively print different color aspect records on a blank film so as to form a composite record in natural colors. When the blank on which one color record has been printed is brought in contact with a second matrix it is essential that the superposed records are coincident, and further that the coincident records are in register, that is, with the respective sprocket holes, frame lines, and recorded details exactly superposed. In other instances to be found in masking, sound track and control processes, the coincident records of the several films are disposed in predetermined relations other than superposition as will be explained hereinafter.

In the imbibition process chosen for example, one way of ascertaining that the coincident records of the printed blank and the second matrix are registered consists in placing a large mark at a point on each film adjacent coincident records and bringing the two film strips together on an endless carrier having, for example, teeth or pins which fit in the sprocket holes of the strips. The register pins insure that the sprocket holes are superimposed and if it is observed that the marks are also superimposed the coincident records of the strips will be in exact register. While the carrier moves at low speeds, any relative displacement of the marks by one or more sprocket holes can be detected visually and indicates that coincident records throughout the length of both film strips will be displaced the same amount. If, however, the carrier speed is increased, it becomes difficult and finally impossible to detect such displacement or deviation by the visual method.

Objects of the present invention are to overcome the above-mentioned difficulty and to provide a way of detecting displacement of superposed film strips traveling in high speed motion picture processing apparatus which is accurate and simple in operation.

In one aspect the invention relates to apparatus for detecting deviation of coincident records on two or more motion picture film strips from a predetermined relative disposition while the strips are being fed through a processing or like machine, the apparatus comprising an element carried on each film strip which is capable of initiating a signal in a detector adjacent the path of each strip at points which define the desired relation of the strips, and an indicator for presenting the signals initiated by the elements so that the relation of the signals as presented may be interpreted to determine the actual relation of coincident records on the film strips being fed through the machine.

Although exact physical or optical superposition exemplifies a "predetermined relation" in the sense used herein, that term also includes precise disposition of coincident records with regard to definitely related points of reference, whether these points are themselves superimposed or not, as will be described more fully hereinafter. If the signaling elements are placed at coincident points of the film strips, and it is desired to superimpose coincident records of the films, then the detectors will define the desired relation of the records, i. e., superposition, if they are located along the paths of the film strips equidistant from the point where coincident records are to be superimposed. Thus, one detector might respond to elements on different films if the films are fed along a common path prior to being superimposed.

Various signal initiating elements may be used such as a mark on the film which may be detected by optical means or a notch or abutment on the film which will mechanically actuate a lever or like commonly known means, but preferably a piece of metal is attached to the film and detected by any well known capacitors or inductive pickup.

In another aspect the apparatus includes means for distinguishing between the signal initiated by the element on one film strip and by an element on another strip. Distinguishing or differentiating may be effected by controlling or designing the detectors so that they generate different types of electric signals, or by changing the form of the signal before it is presented by the indicator. If desired the elements carried by the strips may be different in form, thus causing the detector to respond differently.

In a further aspect means are provided for controlling the period during which the indicator presents the signal so that it is related to the speed at which the film strips move past the detectors. For example, the frequency of an oscillograph sweep deflection voltage may be set to equal the frequency at which given lengths of the film strip pass a detector.

In a still further aspect the invention involves the method of passing signal initiating elements carried on film strips past responsive detectors and presenting the signal response to indicate the relation of the film strips. Preferably the signals are presented visually and in such form that one signal may be distinguished from another. It is desirable that the method include a way of presenting the signals during intervals which are related in frequency to the speed of the films.

For the purpose of illustration typical embodiments of the invention are shown in the accompanying drawings in which:

Fig. 1 is a schematic diagram of the invention as applied to imbibition printing apparatus;

Fig. 2 is a fragmentary plan view of film strips carrying signaling elements;

Fig. 3 is a front view of an oscilloscope screen showing signals thereon;

Fig. 4 is a fragmentary plan view of film strips as in Fig. 2 in combination with magnetic detectors;

Fig. 5 is a front view of an oscilloscope screen presenting signals according to the embodiment shown in Fig. 4;

Fig. 6 is a schematic diagram of another embodiment of the invention;

Figs. 7 to 9 are front views similar to Figs. 3 and 5 of an oscilloscope screen showing signals in various relations; and Fig. 10 is a simplified schematic diagram of a further application of the invention in imbibition apparatus.

The imbibition printing apparatus shown in Fig. 1 comprises two drums or sheaves 51 with a pin belt 52 trained thereover. A blank film B, having a gelatin covered surface to be printed by imbibition from matrices M and M', is fed from the reel 56 through a water tank 57 and thence to the belt 52 between seating rolls 58. The matrix M is fed from a reel 59 through a tank 60 containing dye of the appropriate color, thence through a wash tank 61 to wash off the dye superficially adhering to the surface of the film, thence through the water tank 57, and thence to the belt 52 between the seating rolls 62. The coated face of the blank B is directed away from the belt, and the printing side of the matrix M is directed toward the belt so that the two films are pressed into face-to-face contact by the seating rolls 62. After the films emerge from the tank 57 they are again pressed together by a pair of pressure rolls 63 and a single pressure roll 64. After the two films have traveled in contact for a sufficient distance for the dye to be imbibed by the blank from the matrix, both films are fed off the belt over a guide roller 65 and thence between a pair of rolls 66 where the two films are peeled apart. The matrix M then loops back and forth over pairs of opposed guide rolls in the drying compartment 67 and thence passes to the take-up roll 68. After looping back and forth between pairs of opposed guide rolls in the drying compartment, the blank B feeds over guide rolls 69 and 70 into another water tank 71 where it is again conditioned to receive an imbibition print before it returns to the belt between the seating rolls 72. After passing through dye and wash tanks corresponding to 60 and 61, the second matrix M' feeds through the tank 71 to the belt 52 between seating rolls 73. After the films emerge from the tank 71 they are again pressed together by the seating rolls 74 and the pressure roll 75. Before entering the tank 71 the films B and M pass the magnetic pickups 4 and 6 which are connected to the oscilloscope 5, as hereinafter described in detail. After continuing in contact with each other throughout a length of the belt path sufficient to effect the dye transfer, the two films are fed from the belt over a roll 76 to a pair of rolls 77 where the two films are peeled apart, the printed film B passing through the drying compartment 78 to the take-up reel 79 and the matrix M' passing through the drying compartment to a take-up reel 80.

Thus the film B is printed with a composite record consisting of two series of pictures of complementary colors from the color-separation matrices M and M'. Instead of only two series of pictures three series of different colors may be printed, in which case the belt may be trained over two pairs of sheaves in the form of a double loop, as in the Kienninger Patent No. 1,803,115, or three sheaves may be located at three corners of a triangle so that in passing from sheave to sheave the belt would successively pass along the three sides of the triangle, a color-separation film being fed to the belt along each of the three sides of the triangle.

Various details of construction of parts of the apparatus diagrammatically represented in Fig. 1 are disclosed in the prior Patents Nos. 1,675,743; 1,704,328; 1,707,695; 1,707,699; 1,707,710; 1,707,733; 1,928,714; 2,257,254; and 2,271,572.

It is apparent that the scenes on matrix M' must be superposed exactly on the coincident scenes previously printed on the strip B by the matrix M. Similarly, in printing sound tracks on motion picture film strips, whether in color or in black and white, and whether the picture record is printed on the strip before or after the sound record, it may be necessary to register the strip carrying a sound record with a strip carrying a picture record. In this case it is essential that, prior to registering, any given portion of the sound record be disposed a certain distance nearer to a fixed point of the printing apparatus, for instance, twenty frames nearer the point where the two strips are registered than the coincident picture record so that each portion of the sound track be spaced on the final print a certain distance from the scene to be projected at the same time. A like problem arises in composite cinematographic processes wherein an auxiliary film strip carrying special process or silhouette masks, a color correction mask or an unsharp mask for improving definition is interposed between a negative record strip and a light sensitive strip so that, for example, in the case of special process masks certain areas of the sensitive strip are masked while the other areas are printed from the negative. Here it is necessary that coincident records of negative and masking strips or their images are superposed, and if the sensitive strip carries a latent record in the areas masked, this record must be superimposed with coincident records of the first two records. This invention is equally applicable to these and similar processes in which film strips are superimposed optically rather than by contact, and in the case where two or more strips are registered with another or others whether those two or more are superimposed simultaneously or successively.

According to the embodiment of the invention shown in the drawings, metal clips 1 and 2, and 3 are attached to the blank film strip B and the second matrix strip M', respectively (Figs. 1 and 2). As these strips pass the above-mentioned magnetic pickups 4 and 6, momentary electric pulses are generated (Fig. 1). These pulses are transmitted electrically to the oscilloscope 5 and presented as peaks in the trace shown on the fluorescent screen of a cathode ray tube 20 (Fig. 3).

The two metal clips 1 and 2 are placed on the strip B approximately one-eighth of an inch to either side of a point corresponding to the location of one clip 3 on the second matrix strip M'. When the films are superposed on the carrier in exact correspondence, the clip 3 lies midway between the clips 1 and 2.

Preferably the magnetic detectors are placed at locations in advance of and equally distant from the point where the strips on separate paths are superimposed. Thus in Fig. 1 the detector 4 is displaced vertically from detector 6 equalizing the distances from each detector along the paths followed by the films M' and B to the rolls 73 where the strips are superimposed. In Figs. 4 and 6 it is assumed that the detectors are equidistant from the location where the films will be registered.

It is possible, however, to locate the detectors unequally distant from the register point if the clips on the film strips are shifted correspondingly. Or, if the error in location is known, the indications of the oscilloscope may be interpreted to give correct understanding of the relation of corresponding records in the screen. For example, in printing a sound track on a picture-carrying film strip where the sound record leads the picture record by twenty frames, the detector for the sound negative may be advanced twenty frames or it may be noted that when the oscilloscope indicates a deviation from superposition of twenty frames that the two film strips are disposed in the desired predetermined relation. Preferably, however, the clip on the sound negative will be adjusted twenty frames behind the sound record coincident with the marked picture record, since, as presently will be explained, the oscilloscope normally need show a maximum deviation of only eight frames.

Fig. 10 is a simplified illustration of a further application of the invention to imbibition apparatus shown more fully in Fig. 1. In this figure, which omits certain processing tanks, the blank film B is seated on the pin belt 100 by the roller 107 with the pins 101 inserted in its sprocket holes. The first matrix M, carrying one color aspect dye after passing the pickup 103, is superimposed on the film B at the roller 108, the dye being imbibed by the blank B until the matrix M leaves the blank at roller 109. The blank is subsequently prepared for imbibition from a second color aspect matrix M', which passes the detector 106, is superimposed on the blank at roller 111 and removed at roller 112.

This application illustrates a relation between the two film strips M and M' which are not superimposed but which must be disposed in such a predetermined relation that coincident records on these two strips are successively superimposed on the same area of a third strip, the blank B. Physically a particular frame on the matrix M, prior to passing the roller 109, should be disposed the same distance before the roller 111 as the coincident frame on the matrix M'. In this case, if the metal clips 102 and 104 are placed at coincident frames of the two strips, then the detectors 103 and 106 will be located equidistant from the roller 111 along the paths of the strips M and M' respectively.

The detector 4 or 6 may be any commonly used magnetic pickup sensitively-responsive to the movement of metal within its field.

Such a pickup reacts to variations in the magnetic field of its core caused by movement of metal in the field to induce a transient current in a coil associated with the core. Usually the magnetic field is produced by a permanent or an electromagnet. However, instead of a magnetic field, an electrostatic field may be used, which field can be produced by impressing a voltage on the plate of a capacitative pickup and using the moving metallic element to vary the capacitance of the pickup circuit. The pickup may generate a short pulse of electrical energy or vary a current flowing through the coil of the pickup. In any case, a brief electrical signal is generated when the metal clips 1, 2 or 3 are carried by the film past the detector.

The signals are transmitted through the conductors 9 and 11 and 14 or 16 to the oscilloscope unit indicated at 5 in Fig. 1. Within this unit, the rectangle R represents a conventional rectifier power supply providing high voltage for the cathode ray tube 20 and various potentials to the various components of the electronic circuit. Another stage of the oscilloscope is an amplifier A, which amplifies the voltage change of the pulses. The amplified peaks are applied to the vertical deflection plates 27 and 28 of the cathode ray tube 20. Since there are two clips on the blank B and but one on the matrix M', the signal generated by one strip may be differentiated from those generated by the other.

The rectangle S represents a horizontal sweep generator of design conventional except that the control 21 for the frequency of the sweep may be calibrated in feet per minute with reference to the linear speed of the film strips. With this control the frequency of the horizontal sweep is timed to approximately one-eighth of the frequency with which the frames of the film strip pass a given point, that is, the duration of the sweep represents eight frames at the given film strip speed. The sweep voltages so generated are applied to the horizontal deflection plates 29 and 30 of the tube 20.

Normally the sweep circuit produces a horizontal sweep trace on the fluorescent screen of the cathode ray tube. On generation of a signal by one of the detectors, a positive or negative peak will appear on the trace. Thus, if the blank B and the matrix M' are in exact correspondence, a single peak will appear on the screen centered between a pair of peaks (Fig. 3). Or if, for example, the matrix M' deviates from correspondence with the blank B by four frames, a single peak, representing the matrix on the horizontal sweep trace, will appear disposed approximately half the length of the trace from a pair of peaks which represent the blank. As shown in Figs. 4 and 5, the blank B leads the matrix M' by one sprocket hole, and the double peak is slightly displaced to the left of the single peak. The usual oscilloscope trace runs from left to right as the screen is viewed so that the signal generated first in time will be presented to the left of later signals. Thus, this invention will not only detect the deviation from correspondence but also will indicate the direction of the deviation, and, by suitable interpretation or calibration of the oscilloscope, the amount of deviation.

As shown in Fig. 5, one of the signals from the blank on the matrix may be inverted in polarity to aid in differentiating between the two signals. Then, if desired, each film may carry but one signaling element, as shown in Fig. 6. Inversion of the signal may be effected by reversing the connections of the ground lead and conductor at one of the pair of detector terminals 7 and 8, as shown in Fig. 4. Or, by means of switch 13, the signal from one of the detectors may be applied through the conductor 16 to an inverter stage I before amplification. Inversion might also be accomplished by amplifying each detector signal individually by two separate amplifiers in the amplifier stage A and applying the output of each amplifier to a different one of the vertical deflection plates 27 or 28 of the cathode ray tube 20. Any of these means of differentiating the signals will produce an indication such as shown in Figs. 5 or 7 to 9.

Fig. 9 shows an alternate form of presenting the signals. In this form a circular sweep 92 rather than linear oscilloscope sweep is produced by any one of the well known ways, such as applying two sinusoidal voltages ninety degrees out of phase to the horizontal and vertical deflection plates, respectively, to form a Lissajou circle or by using a rotating magnetic coil. On the circular sweep 92, the blank and matrix signals appear as radial peaks 93 and 94 respectively. Such a sweep wave form has the advantage of expanded length and of continuity. It has been found that most of the errors in correspondence are less than four frames so that a circular sweep cycle representing an eight frame interval is usually adequate to indicate the amount and direction of deviation. Thus for normal use the circular sweep is preferable.

Fig. 6 shows a modified embodiment of the electronic circuit associated with the detectors and the oscilloscope. In this application of the invention the horizontal sweep oscillator S' is not free running but is blocked until the first of the blank or matrix signals is generated. The construction and operation of the circuit is as follows: As the metal clips 31 and 32 on the film strips B and M, respectively, pass the pickups 33 and 34, the two signals represented by the wave forms $b$ and $m$ are generated. These signal voltages are applied to a trigger circuit, trigger, and an inverting and mixing circuit, differentiator. For the trigger circuit the two signals are conducted to a mixing or adding stage MI such as is described in "Electronic Circuits and Tubes," Cruft Electronics Lab., 1st ed., 1947, McGraw-Hill Book Co., at page 859. The output of the mixer will be the two signals in proper time sequence, as represented by wave form $c$. This output is applied to a one-cycle multivibrator stage V, such as the type described in "Electronic Circuits and Tubes," page 837. Such a multivibrator executes one square wave oscillation when a single signal is applied to its control grid. The first signal in time, in this example the blank signal component $b$ of the wave form $c$, triggers the multivibrator. The multivibrator then executes its cycle without being affected by subsequent signals, such as the matrix component $m$. The square wave output $d$ of the multivibrator in turn controls the horizontal sweep circuit S' causing it to generate a one-cycle saw tooth voltage $e$. Usually the sweep circuit output is two opposite voltages, one positive $e+$ and one negative $e-$, applied to the left and right-hand deflection plates, respectively. The period of the sweep wave form may be adjusted by conventional means to equal the period of eight motion picture frames traveling at the selected linear speed. This period may be determined in the multivibrator or the sweep oscillator.

In the differentiator circuit one of the signals, as shown in Fig. 6 the matrix signal $m$, is inverted in polarity in the inverter stage I'. The inverted signal $m'$ and the original signal $b$ are added in the second mixer M2, and amplified in a final amplifier stage A'. As is customary, the compound signal output $g$ of the amplifier is a balanced positive signal $g+$ and a negative signal $g-$ applied to the upper and lower vertical deflection plates 27—30, respectively, of the cathode ray tube 44.

Fig. 7 shows the wave form which would be traced on the oscilloscope screen 83 if the films B and M' deviated two frames from correspondence, as shown in Fig. 6. Since the positive component will always represent the signal initiated by the blank film B and the negative component that by the matrix M', the block letter B and M may be placed on the face of the screen. Also, if desired, the screen may be marked with calibration lines corresponding to the frames and sprocket holes.

Fig. 8 shows the wave form presented when the matrix film M' leads the blank film B by six frames. It will be noted that in Figs. 7 and 8 the beginning of the horizontal sweep and the first generated signal coincide, regardless of whether the matrix signal $m$ or the blank signal $b$ is first.

It should be understood that the present disclosure is for the purpose of illustration only, and that this invention includes all modifications and equivalents which fall within the scope of the appended claims.

We claim:

1. In the art of feeding a plurality of motion picture film strips along paths with the record at any location on one film strip disposed in predetermined relation to a coincident record on another film strip, apparatus for detecting deviation of the records from said predetermined relation comprising a signal-initiating element carried by each of the strips, an electrical detector adjacent the path of each of said strips at points defining said predetermined relation, said detector being responsive to said element to generate an electrical signal on passage of an element thereby, and an oscillograph actuated by the detectors for presenting the signals initiated by the elements in a spaced relation which indicates the actual relation of coincident records on the several strips.

2. In the art of feeding a plurality of motion picture film strips along paths with the record at any location on one film strip disposed in predetermined relation to a coincident record on another film strip, apparatus for detecting deviation of the film strips from said predetermined relation comprising a signal-initiating element carried by each of the strips, a detector adjacent the path of each of said strips at points defining said predetermined relation, said detector being responsive to said elements to initiate a signal on passage of an element thereby, and a signal indicator actuated by the detectors having differentiating means for presenting simultaneously the signals initiated by one of the elements in one form and that initiated by another element in a different form, so that the spaced relation of the differentially presented signals indicates the actual relation of coincident records on the several strips.

3. In the art of feeding a plurality of motion picture film strips along paths with the record at any location on one film strip disposed in predetermined relation to a coincident record on another film strip, apparatus for detecting deviation of the film strips from said predetermined relation comprising a signal-initiating element carried by each of the strips, a detector adjacent the paths of each of said strips at points defining said predetermined relation, said detector being differentially responsive to said elements to generate in one form a signal on passage of one element thereby and in a different form a signal on passage of another element thereby, and a signal indicator actuated by the detectors for presenting simultaneously the signals initiated by the elements in accordance with the different forms thereof so that the spaced relation of the different signals presented indicates the actual relation of coincident records on the several strips.

4. In the art of feeding a plurality of motion picture film strips along paths with the record at any location on one film strip disposed in predetermined relation to a coincident record on another film strip, apparatus for detecting deviation of records from said predetermined relation comprising a signal-initiating element carried by each of the strips, a detector adjacent the path of each of said strips at points defining said predetermined relation, said detector being responsive to said element to generate a signal on passage of an element thereby, and a signal indicator actuated by the detectors for presenting simultaneously the signals initiated by the elements in a spaced relation which indicates the actual relation of coincident records on the several strips.

LAURISTON E. CLARK.
LESLIE W. OLIVER.

REFERENCES CITED

The following references are of record in the file of this patent:

UNITED STATES PATENTS

| Number | Name | Date |
|---|---|---|
| 1,287,436 | Remington | Dec. 10, 1918 |
| 1,747,037 | Tschapp | Feb. 11, 1930 |
| 2,084,760 | Beverage | June 22, 1937 |
| 2,178,074 | Jakel et al. | Oct. 31, 1939 |
| 2,289,737 | Sorkin | July 14, 1942 |
| 2,430,125 | Kipnis | Nov. 4, 1947 |
| 2,485,343 | Zuschlag | Oct. 18, 1949 |